(12) United States Patent
Mendiratta et al.

(10) Patent No.: US 9,602,634 B2
(45) Date of Patent: Mar. 21, 2017

(54) GLOBAL SESSION IDENTIFIER

(71) Applicant: Avaya Inc., Basking Ridge, NJ (US)

(72) Inventors: Harsh V. Mendiratta, East Brunswick, NJ (US); Gordon R. Brunson, Broomfield, CO (US); Kurt Haserodt, Westminster, CO (US); Raji Chinnappa, Allentown, NJ (US); Dale Worley, Waltham, MA (US)

(73) Assignee: Avaya Inc., Basking Ridge, NJ (US)

( * ) Notice: Subject to any disclaimer, the term of this patent is extended or adjusted under 35 U.S.C. 154(b) by 558 days.

(21) Appl. No.: 13/626,066

(22) Filed: Sep. 25, 2012

(65) Prior Publication Data

US 2013/0212242 A1 Aug. 15, 2013

Related U.S. Application Data

(60) Provisional application No. 61/599,281, filed on Feb. 15, 2012.

(51) Int. Cl.
*H04L 29/06* (2006.01)
*H04L 29/08* (2006.01)

(52) U.S. Cl.
CPC .......... *H04L 69/22* (2013.01); *H04L 65/1006* (2013.01); *H04L 65/1069* (2013.01); *H04L 65/1093* (2013.01); *H04L 65/403* (2013.01); *H04L 67/146* (2013.01)

(58) Field of Classification Search
CPC ............. H04L 65/1003; H04L 65/1006; H04L 65/1069
USPC ........................................................ 709/223
See application file for complete search history.

(56) References Cited

U.S. PATENT DOCUMENTS

| 4,718,002 | A | * | 1/1988 | Carr .............................. 709/201 |
| 8,165,113 | B1 | * | 4/2012 | Peters, Jr. ........... H04L 65/1006 370/389 |
| 8,228,861 | B1 | * | 7/2012 | Nix .............................. 370/329 |
| 2005/0125543 | A1 | * | 6/2005 | Park et al. ..................... 709/227 |
| 2005/0243746 | A1 | | 11/2005 | Mutikainen et al. |
| 2006/0023751 | A1 | * | 2/2006 | Wilson et al. ................ 370/474 |
| 2006/0200469 | A1 | * | 9/2006 | Chidambaran et al. ........ 707/10 |

(Continued)

FOREIGN PATENT DOCUMENTS

| EP | 2209280 | 7/2010 |
| WO | WO 2005/034551 | 4/2005 |

OTHER PUBLICATIONS

Official Action for European Patent Application No. 12186434.2, dated Mar. 12, 2014 4 pages.

(Continued)

*Primary Examiner* — Kevin Bates
*Assistant Examiner* — Mark A Scott
(74) *Attorney, Agent, or Firm* — Sheridan Ross P.C.

(57) ABSTRACT

Systems and methods are described for creating and managing Global Session Identifiers (GSIDs) for communication sessions. GSIDs provide a way to globally identify communication sessions including those communication sessions that have experienced one or more topology changes. The GSID may be considered a header itself or a value within a header and information contained within a GSID can be used to trace backwards through time to find the session segments that led up to (or exist concurrently to) a currently signaled session.

20 Claims, 5 Drawing Sheets

(56) References Cited

U.S. PATENT DOCUMENTS

| | | | |
|---|---|---|---|
| 2007/0033249 | A1 | 2/2007 | Samdadiya et al. |
| 2007/0259651 | A1* | 11/2007 | Bae et al. ............... 455/412.1 |
| 2008/0037447 | A1* | 2/2008 | Garg et al. ................. 370/260 |
| 2008/0089344 | A1* | 4/2008 | Jansson et al. .......... 370/395.2 |
| 2008/0162637 | A1* | 7/2008 | Adamczyk et al. .......... 709/204 |
| 2008/0240447 | A1* | 10/2008 | Zhu et al. ................... 380/279 |
| 2008/0248763 | A1* | 10/2008 | Park .................... H04W 4/10 455/90.2 |
| 2009/0168985 | A1* | 7/2009 | Yu ................... H04L 12/1822 379/202.01 |
| 2009/0210536 | A1* | 8/2009 | Allen et al. ................. 709/227 |
| 2009/0298458 | A1* | 12/2009 | Bakker et al. ............ 455/404.1 |
| 2009/0327428 | A1* | 12/2009 | Ramanathan et al. ........ 709/206 |
| 2010/0024005 | A1 | 1/2010 | Huang et al. |
| 2010/0169495 | A1* | 7/2010 | Zhang ............... H04W 36/0022 709/227 |
| 2010/0215037 | A1* | 8/2010 | Long ................... H04L 65/1063 370/352 |
| 2010/0293240 | A1* | 11/2010 | Lee .................... H04L 12/1827 709/206 |
| 2010/0299442 | A1* | 11/2010 | van Elburg ............. H04L 63/08 709/229 |
| 2011/0032906 | A1* | 2/2011 | Mutikainen et al. ......... 370/331 |
| 2011/0040836 | A1* | 2/2011 | Allen ................... H04L 65/1093 709/205 |
| 2011/0064073 | A1* | 3/2011 | Lu et al. ...................... 370/352 |
| 2011/0075653 | A1* | 3/2011 | Potts ................... H04L 65/1069 370/352 |
| 2011/0077058 | A1* | 3/2011 | Cai et al. ....................... 455/573 |
| 2011/0270922 | A1* | 11/2011 | Jones ................... G06F 3/0486 709/204 |
| 2011/0295996 | A1* | 12/2011 | Qiu ........................ G06F 9/505 709/224 |
| 2012/0124222 | A1* | 5/2012 | Noldus et al. ................ 709/227 |
| 2012/0184244 | A1* | 7/2012 | Cai et al. ....................... 455/408 |
| 2012/0221739 | A1* | 8/2012 | Schroeder et al. ........... 709/229 |
| 2013/0094451 | A1* | 4/2013 | Pavlovski et al. ............ 370/329 |
| 2013/0097265 | A1* | 4/2013 | Lee ........................ H04L 51/38 709/206 |
| 2013/0205033 | A1* | 8/2013 | Peter ................... H04L 65/1046 709/228 |
| 2013/0212190 | A1* | 8/2013 | Patil .............................. 709/206 |
| 2013/0250810 | A1* | 9/2013 | Ho et al. ....................... 370/255 |
| 2013/0254371 | A1* | 9/2013 | Wahl ...................... H04L 67/14 709/223 |
| 2013/0294443 | A1* | 11/2013 | Kahn ................... H04L 65/1073 370/352 |

OTHER PUBLICATIONS

Kaplan "A Session Identifier for the Session Initiation Protocol (SIP) draft-kaplan-sip-session-id-02," SIP Working Group, Internet Draft, Mar. 8, 2009, 12 pages.

Extended Search Report for European Patent Application No. 12186434.2, dated Dec. 20, 2012 9 pages.

The References Header for SIP, http://tools.ietf.org/html/draft-worley-references-07.

Official Action for European Patent Application No. 12186434.2, dated Mar. 18, 2015 5 pages.

Official Action for European Patent Application No. 12186434.2, dated Mar. 4, 2016 5 pages.

* cited by examiner

GLOBAL SESSION IDENTIFIER

CROSS REFERENCE TO RELATED APPLICATIONS

This application claims the benefit of U.S. Provisional Application No. 61/599,281 filed Feb. 15, 2012, the entire disclosure of which is hereby incorporated herein by reference.

FIELD OF THE DISCLOSURE

The present disclosure is generally directed toward communications and more specifically toward unified communications.

BACKGROUND

In the Session Initiation Protocol (SIP), a large number of features involve two or more end-to-end sessions. Examples of such features include call transfers, conferencing, etc. Also in SIP, each point-to-point session is independent—resulting in independent SIP Dialog Ids for every session (i.e., call-id+tags). Some SIP Architectures employ Back-to-Back User Agents (B2BUAs) for various purposes (e.g., sequenced applications). The problem with employing B2BUAs rather than proxies is that B2BUAs break the coherency of the point-to-point calls. In other words, when a single session traverses B2BUA based elements, the SIP dialog ids are modified as defined by SIP standards.

Current solutions like P-Charging-Vector (IMS Charging ID value correlates a SIP call as it traverses different sequenced applications including B2BUAs), Universal Caller ID (An identifier to tag a contact center call as it traverse various elements like announcement server, self-service portal etc. before landing at the agent), and Session-Id provide a unique identifier to correlate the parts of an end-to-end session as it traverses B2BUAs.

However, for the SIP features comprising multiple individual sessions (that traverse via B2BUAs or proxies), there is no easy way to correlate those sessions. Indeed, while there are currently solutions to overcome the problem of B2BUAs modifying Dialog Ids, there is no currently viable solution to address the problem arising due to call topology modification.

SUMMARY

It is with respect to the above issues and other problems that the embodiments presented herein were contemplated. In particular, embodiments of the present disclosure provide a simple and convenient way of correlating communications sessions or dialogs. As can be appreciated, the terms session, communication session, dialog, SIP dialog, and the like will be used interchangeably to refer to any communication between two or more individuals established with communication equipment over a communication network.

Embodiments of the present disclosure introduce the concept of a Global Session Identifier (GSID). The proposed GSID, in some embodiments, is implemented as a token that identifies a session end-to-end (from originator to destination) even as the session traverses B2BUA-based elements resulting in a chain of multiple SIP-based dialog ids.

The GSID provides the ability to logically tie different seemingly independent sessions/calls together. In some embodiments, the GSID may be combined with Endpoint View information and the GSID can tie the Endpoint view of the session participants (e.g., originator and destination) together. As such, the GSID can be created upon receiving a new request. This may cause the GSID to be globally unique in time and space. Additional details regarding the construction and format of an EPV are described, for example, in U.S. Provisional Patent Application No. 61/582,176, filed Dec. 30, 2011, the entire contents of which are hereby incorporated herein by reference.

In some embodiments, the GSID is not created by combining the two EPVs. Instead, the GSID is created at the time of the call originator's EPV (EPV-o) creation. Then, the same GSID is associated with the destination's EPV (EPV-t) when Session Manager (SM) (or any similar server that controls call and signaling flows in a communication system, such as a communication server) receives the first response from the destination. After the GSID is created, the value of the GSID is carried in a Global Session Id header in all SIP requests and responses that are subsequently exchanged during that session. Furthermore, B2BUAs are allowed and expected to pass the GSID without modification since the GSID is not contained in a modified header.

The EPV is a header that provides the GRUU and dialog ID known to the endpoint. This is rarely the Contact URI and dialog ID within the message itself because B2BUAs change these headers.

A "GRUU" is a Globally Routable User Agent (UA) URI—a URI that defines a particular device rather than a user. This is generally not simply an IP address: due to Network Address Translation (NAT) and firewalls, IP addresses are rarely globally routable.

If a new request generated in the context of an existing dialog does not contain the correlation id (e.g., third-party device based call transfer flow), SM creates a new GSID. Later, SM associates the independent sessions (sessions with different GSIDs) based on the GSID parameter in various mid-dialog SIP requests/responses, new requests, (e.g., REFER-To header, INVITE-R R-URI, INVITE-J R-URI, Contact header, Other headers and parameters (e.g., call-info, av-ouri parameter)). When the association between two GSIDs is established, SM fills and inserts the nature/reason of the GSID association in the GSID header as an associated GSID. With the association of GSIDs in the GSID header, SM is capable of creating a global session identifier that is persistent even when call topology changes due to one or more of changes in session participants/users, changes in devices that are involved in the session, changes in which endpoint has control over the session, and/or changes in the type of control that a device exerts over a session.

In some embodiments, if the received out-of-dialog request does not contain a GSID, SM creates a new GSID. SM then looks for the association of the current session request with other sessions by examining the contents of the current SIP message. The association may be detected by examining the contents of the R-URI, headers, parameters, and attachments of the SIP message. The places SM examines for detecting the potential association include, but are not limited to, the REFER-To header, INVITE-Join R-URI, INVITE-Replace R-URI, Contact header, Call-Info header, av-ouri parameter, attachments, and other proprietary headers and parameters of the SIP message. In some embodiments, SM examines subsequent responses and mid-dialog requests and responses for potential association to detect associations that are established and/or becomes visible later in the call and feature phase. If there is no association, SM inserts the GSID in the Global Session ID header. If and when an association among independent sessions is detected, SM inserts the association by inserting additional parameters to the Global Session Id header identifying the GSID of the associated session (e.g., inserting the current GSID of the original session as well as the GSID of the new session that is associated with the original session perhaps along with other information describing why the association has been created). In some embodiments, SM also inserts the source of the association as a parameter in the header. With the association of the GSIDs, SM is capable of creating, labeling, and logging the messages with the Global Session ID header that correlates all portions of a call even when the call topology changes due to one or more of changes in session participants/users, changes in devices that are involved in the session, changes in which endpoint has control over the session, and/or changes in the type of control that a device exerts over a session.

In some embodiments, there is enough information in a GSID Header to trace backwards through time to find the session segments that led up to (or exist concurrently to) the currently signaled session as long as the GSID Headers are captured along with any session databases, signaling traces, error logs, or call records. Given a GSID or associated GSID, embodiments of the present disclosure enable an easy-to-execute and search among the sessions, logs, or traces to find any SIP Sessions also containing a matching GSID.

As used herein, the term "GSID" or "Global Session Identifier" may refer to any number, character, set of numbers, set of characters, alphanumeric sequence, string, or collection of elements that identify a communication session. The GSID may be randomly, pseudo-randomly, or sequentially generated in response to the creation of a new communication session.

The term "GSID Header" or "Global Session ID Header", as used herein, may refer to any portion of a message that carries a GSID, multiple GSIDs, or information that describes an association between GSIDs. In some embodiments, it may be possible to include a first GSID, a second GSID, and a description of the reason why the first and second GSIDs have been associated within the Global Session ID Header. While the term "header" is used to describe the portion of a message (e.g., SIP message, IP packet, etc.) that carries the identification information, it should be appreciated that such identification information may be included in a header, sub-header, footer, payload, or any other content-bearing portion of a message.

Further still, the term GSID or Global Session Identifier may also be used to describe the header that carries the identification information of one or more communication sessions. Accordingly, session identification information may be referred to as a GSID or the container (e.g., header, footer, sub-header, payload, message body, etc.) of the identification information may be referred to as a GSID without departing from the scope of the present disclosure. Where the GSID is used to refer to the container of identification information, the GSID may include identification information for multiple sessions (e.g., a combination of session identifiers), information describing that an association between sessions has been created, and/or information describing why an association between sessions has occurred.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
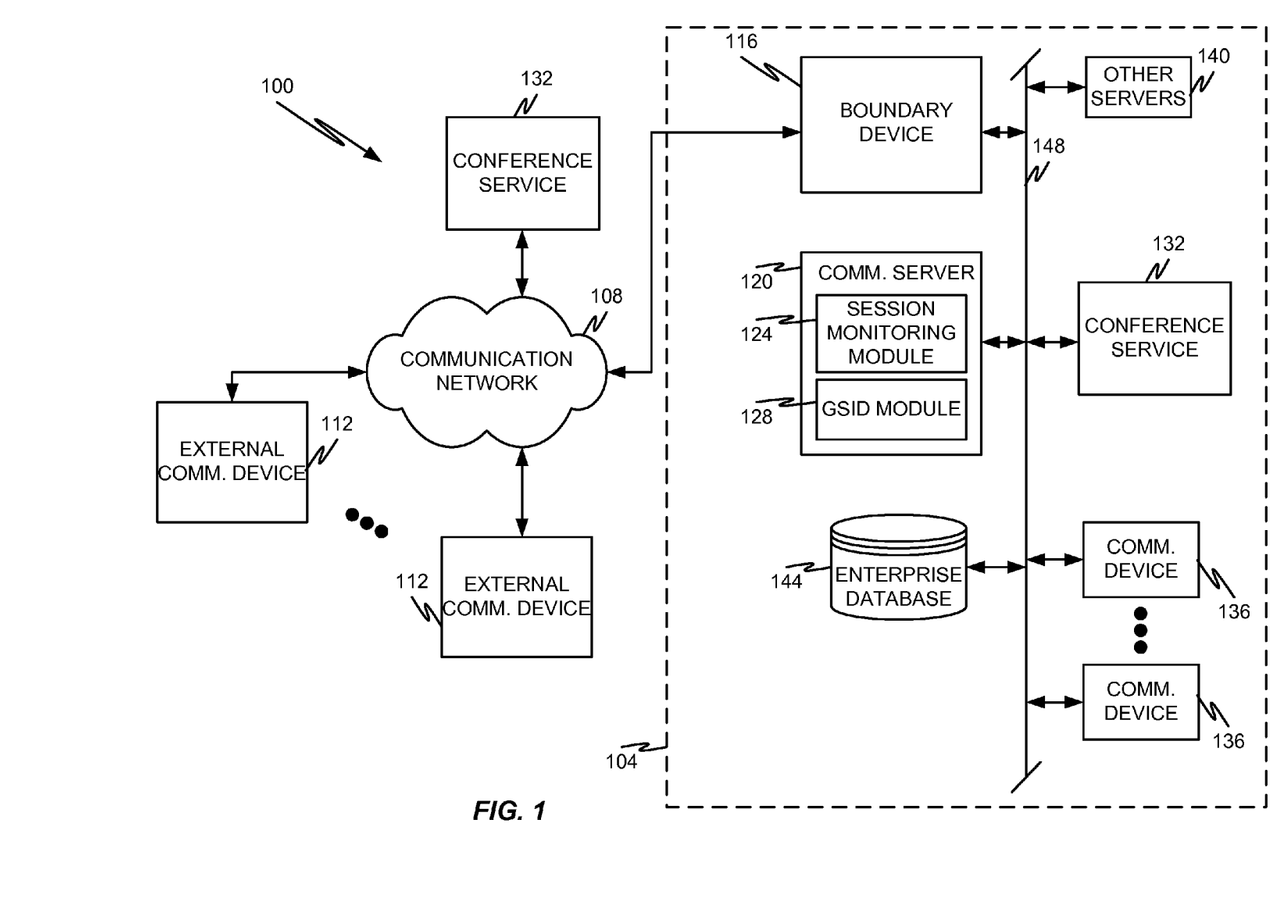
FIG. 1 is a block diagram of a communication system in accordance with embodiments of the present disclosure.

FIG. 1 depicts a communication system 100 according to an embodiment of the present disclosure. The communication system 100 may include an enterprise network 104 that is in communication, via a (typically untrusted or unsecure or public) communication network 108, with one or more external communication devices 112. The external communication devices 112 are generally referred to as "external" because they are either not under the direct control of the enterprise administering the enterprise network 104 or have a decreased level of trust with the enterprise network 104 as compared with communication devices 136 that are within the enterprise network 104. Exemplary types of external communication devices 112 include, without limitation, cellular phones, smartphones, laptops, Personal Computers (PCs), Personal Digital Assistants (PDAs), digital phones, analog phones, and the like.

The communication network 108 may be packet-switched and/or circuit-switched. An illustrative communication network 108 includes, without limitation, a Wide Area Network (WAN), such as the Internet, a Public Switched Telephone Network (PSTN), a Plain Old Telephone Service (POTS) network, a cellular communications network, an IP Multimedia Subsystem (IMS) network, a SIP network, a Voice over IP (VoIP) network, or combinations thereof. In one configuration, the communication network 108 is a public network supporting the TCP/IP suite of protocols.

The enterprise network 104 may include a boundary device 116, a communication server 120 including a session monitoring module 124 and a GSID module 128, one or more internal communication devices 136, a conference service 132, one or more other servers 140, and an enterprise database 144, all of which are interconnected by a (trusted or secure or private) Local Area Network (LAN) 148. Some or all of the functions depicted in FIG. 1 may be co-hosted and/or co-resident on a single server. The depiction of components in FIG. 1 is generally intended to be a logical depiction of the components of the system 100. It should be appreciated that an enterprise network 104 may comprise multiple LANs 148 connected via a WAN, such as the communication network 108. A single enterprise communication network 104 is depicted and described herein for ease of understanding and simplicity and in no way is intended to limit embodiments of the present invention to a single enterprise network 104.

The LAN 148 can be secured from intrusion by untrusted parties by a gateway and/or firewall located between the LAN 148 and communication network 108. In some embodiments the boundary device 116 may include the functionality of the gateway and/or firewall. In some embodiments, a separate gateway or firewall may be provided between the boundary device 116 and the communication network 108.

The communications server 120 can include a Private Branch eXchange (PBX), an enterprise switch, an enterprise server, combinations thereof, or other type of telecommunications system switch or server. The communication server 120 is preferably configured to execute telecommunication functions such as the suite of applications made available via Avaya Aura™ platform of Avaya, Inc., including Communication Manager™, Avaya Aura Communication Manager™, Avaya IP Office™, Communication Manager Branch™, Session Manager™, System Manager™, MultiVantage Express™, and combinations thereof.

Although only a single communications server 120 is depicted in FIG. 1, two or more communications servers 120 may be provided in a single enterprise network 104 or across multiple separate LANs 148 owned and operated by a single enterprise, but separated by communication network 108. In configurations where an enterprise or an enterprise network 104 includes two or more communications servers 120, each server 120 may comprise similar functionality, but may be provisioned for providing its features to only a subset of all enterprise users. In particular, a first communications server 120 may be authoritative for and service a first subset of enterprise users whereas a second communications server 120 may be authoritative for and service a second subset of enterprise users, where the first and second subsets of users generally do not share a common user. Accordingly, in some embodiments, the network boundary device 116 may be provided with a table or set of tables that comprise the information which maps a user to their authoritative communication server 120.

Additionally, multiple servers 120 can support a common user community. For example, in geo-redundant and other applications where users aren't necessarily bound to a single application server, there may be a cluster of equivalent servers where a user can be serviced by any server in the cluster.

In accordance with at least some embodiments of the present invention, the mapping of user identities within a communication request does not necessarily have to occur at the network boundary device 116. For instance, the mapping between an authoritative server and a user may occur "behind" the network boundary device 116 within the enterprise network 104. In some embodiments, the network boundary device may include functionality similar to a Session Border Controller (SBC), a firewall, gateway, or any other device that provides security and/or translation capabilities.

In some embodiments, network boundary device 116 is responsible for initially routing communications within the enterprise network 104 to the communications server 120 responsible for servicing a particular user involved in the communication. For example, if a first enterprise user is being called by an external communication device 112, then the network boundary device 116 may initially receive the inbound call, determine that the call is directed toward the first enterprise user, identify the authoritative communications server 120 for the first enterprise user, and route the inbound call to the authoritative communications server 120. Likewise, communications between internal enterprise users (e.g., internal communication devices 136) may first be serviced by the originating user's authoritative communications server 120 during the origination phase of communications set-up. After the origination phase is complete, the authoritative communications server 120 of the terminating (or called) user may be invoked to complete the termination phase of communications set-up. In some embodiments, the communications server 120 for the originating and terminating user may be the same, but this is not necessarily required. In situations where more than two enterprise users are involved in a communication session, authoritative communications servers 120 for each of the involved users may be employed without departing from the scope of the present invention. Additionally, the authoritative communications servers 120 for each user may be in the same enterprise network 104 or in different enterprise networks 104, which are owned by a common enterprise but are separated by the communication network 108.

Each communications server 120 may include a session monitoring module 124 and GSID module 128. The session monitoring module 124 may comprise the ability to monitor exchanges made during a communication session to determine which, if any, seemingly separate communication sessions are actually combined and, therefore, should be associated with one another by the GSID module 128. More specifically, the session monitoring module 124 may be configured to monitor media and/or control packets transmitted between communication devices or between the conference service 132 and a communication device. In particular, the session monitoring module 124 may be configured to analyze communications for one or more of a REFER-To header, INVITE-Join R-URI, INVITE-Replace R-URI, Contact header, Call-Info header, av-ouri parameter, attachments, and other proprietary headers and parameters of a message. If a message, message header, media packet, or the like is detected to include some indication that the analyzed communication session should be associated with another different communication session, the session monitoring module 124 can further analyze the message component that indicated the association to identify how to search for the associated communication session.

After the session monitoring module 124 has successfully identified the other communication session with which the analyzed session should be associated, the session monitoring module 124 invokes the GSID module 128. The GSID module 128 may be configured to adjust instruct any communication component (e.g., communication device 112, 136, communication server 120, conference service 132, etc.) that is involved in one or both of the associated communication sessions to adjust message parameters or properties (e.g., message contents, message headers, parameters of message headers) to reflect the association between the two communication sessions. In some embodiments, the GSID module 128 may be configured to instruct the entities involved in the communication sessions to adjust a so-called GSID header or parameter of a GSID header (hereinafter referred to as a GSID for ease of discussion) so that the GSID of one communication session references both communication sessions. In other words, a modified GSID is created for both sessions that have been identified as being associated with one another. The modified GSID contained in a message identifies both the session with which the message is transmitted as well as the associated session. This modified GSID enables an interested party to create more detailed and accurate communication history logs and troubleshoot potential problems in the communication system 100.

The conference service 132 may provide conferencing abilities to various communication devices both within and external to the enterprise network 104. While the communication devices 112, 136 may natively support some conferencing capabilities (e.g., having mixers capable of conferencing a small number of communication devices), the conference service 132 may comprise the ability to conference a larger number of communication devices in a conference. In some embodiments, the resources of the conference service 132 include, without limitation, one or more mixers, filters, etc. The conference service 132 can support communication sessions of any media type or multiple media types such as voice, video, web conferencing, combinations thereof, etc.

The conference service 132 may be initially included in the communication session by having each participant of the communication session access a particular bridge or common meeting destination by entering a predetermined address (e.g., telephone number, URL, etc.) and then entering one or more pass-codes (e.g., host code, participant codes, etc.). Alternatively, or in addition, a communication session between two or more communication devices 112, 136 may be moved to the conference service 132 during the communication session in an ad-hoc fashion to support a greater number of communication devices or to support different media types during the conference.

Advantageously, when a communication session is transferred mid-session to the conference service 132, the session monitoring module 124 is capable of detecting the transfer and determining that the communication session at the conference service 132 is associated with the communication session that was established and transferred to the conference service 132. Accordingly, the GSID module 128 is instructed to decorate one or more content-bearing portions of message transmitted during the communication session at the conference service 132 to reflect the session's association with the previous session. The decoration can occur by altering one or more values of a GSID in the communication session.

The other servers 140 may comprise email servers, voicemail servers, calendaring servers, conferencing servers, presence servers, and other types of servers known to provide particular services to client devices. In some embodiments, the other servers 140 may also be considered application servers, which provide one or more applications for use in a communication session.

The internal communication devices 136 can be similar or identical to the external communication devices 112, except they are provisioned, and often owned, by the enterprise. Exemplary types of communication devices 112, 136 include, without limitation, any capable phone, softphone and/or digital telephone. Examples of suitable telephones include the 1600™, 2400™, 4600™, 5400™, 5600™, 9600™, 9620™, 9630™, 9640™, 9640G™, 9650™, and Quick Edition™ telephones, IP wireless telephones (such as Avaya Inc.'s IP DECT™ phones), video phones (such as Avaya Inc.'s Videophone™), and softphones of Avaya, Inc.

The enterprise database 144 includes enterprise subscriber information, such as name, job title, electronic address information (e.g., telephone number, email address, instant messaging handle, direct dial extension, and the like), subscriber contact lists (e.g., contact name and electronic address information), other employee records, and the like.

The various servers and components depicted in FIG. 1 may be implemented separately (i.e., on different servers) or together (i.e., on a single server). In particular, two or more depicted components (e.g., communication server 120 and conference service 132) may be implemented on a single server without departing from the scope of the present invention. Thus, a single device may provide the functionality of several components depicted separately in FIG. 1. As another example, the boundary device 116 and communication server 120 may be implemented on a single device.

Figure 2:
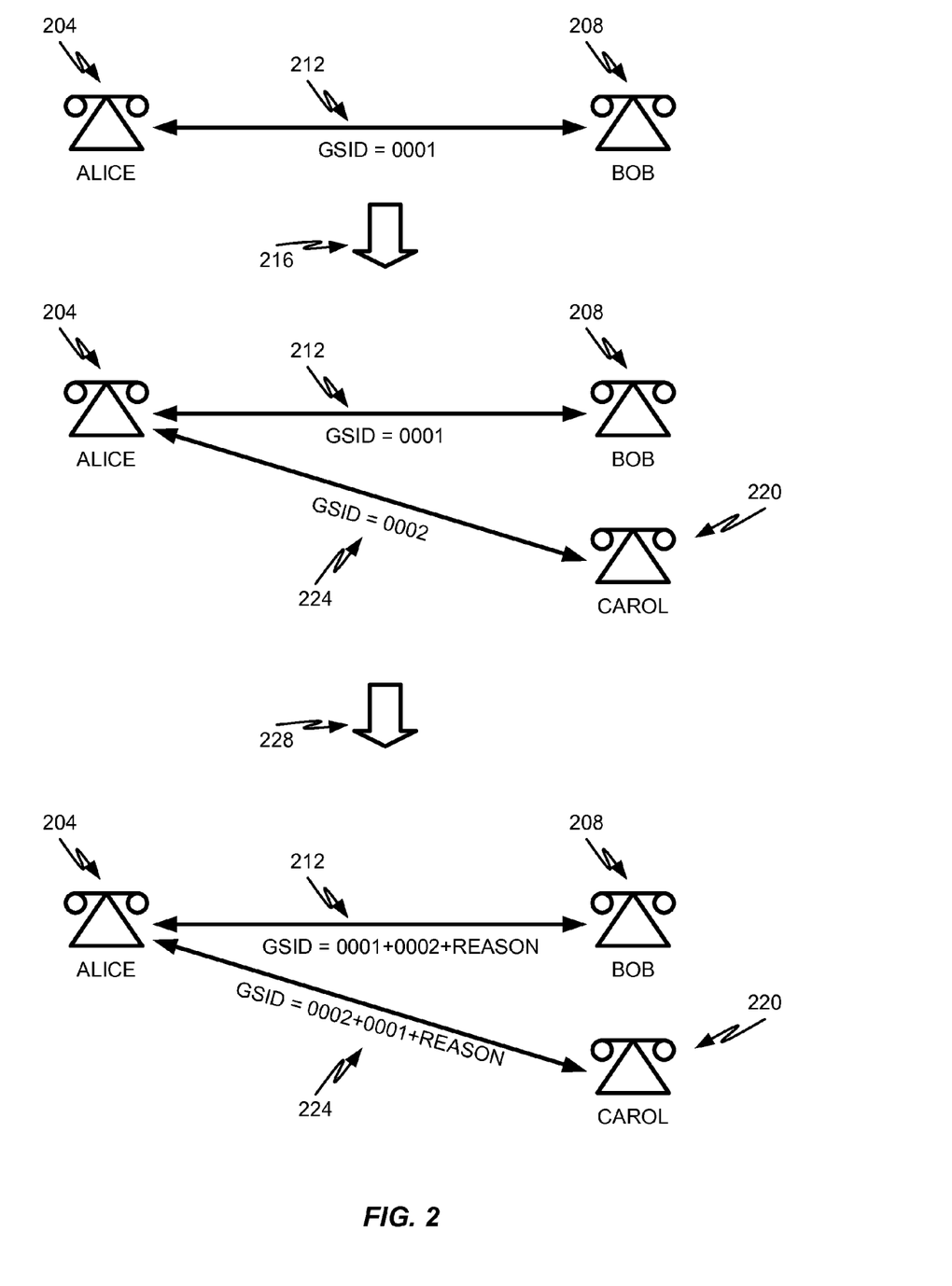
FIG. 2 is a diagram depicting a first communication flow in accordance with embodiments of the present disclosure.

With reference now to FIG. 2, a first communication flow will be described in accordance with embodiments of the present disclosure. The first communication flow begins with a first communication session 212 between a first communication device operated by a first user (e.g., Alice 204) and a second communication device operated by a second user (e.g., Bob 208). The first communication session 212 may have a first GSID (e.g., 0001) assigned thereto by the GSID module 128. The first GSID may be included in one or more message transmitted during the first communication session 212. Specifically, the first GSID may be included in any content-bearing portion or portion(s) of a message such as a header, sub-header, footer, payload, and combinations thereof.

The communication flow continues when a first communication event 216 occurs. The first communication event 216 in this illustrative example includes Alice 204 establishing a connection with a third communication device operated by a third user (e.g., Carol 220). The communication session established between Alice 204 and Carol 220 may be considered a second communication session 224 and may, therefore, have a second GSID (e.g., 0002) assigned thereto. Similar to the first GSID, the second GSID may be carried or represented in one, some or all messages transmitted during the second communication session 224. Furthermore, the second GSID may be assigned by the GSID module 128 of the communication server 120 upon detecting establishment of the second communication session 224.

At this point, Alice 204 may be in a position to conference Bob 208 and Carol 220 into a single conference via a second communication event 228. It should be appreciated that the conferencing of Alice 204, Bob 208, and Carol 220 can be accomplished in a variety of ways. In some embodiments, the conferencing of the participants may occur locally (e.g., at one of the communication devices of the participants) or the conferencing may be facilitated by a conferencing service 132.

The occurrence of either the first or second communication events 216, 228 may be detected by the session monitoring module 124. The first or second communication event 216, 228 may correspond to any transmission of information that indicates the first communication session 212 is associated with the second communication session 224.

The session monitoring module 124 may then invoke the GSID module 128, which instructs one, some, or all of the communication devices and/or any conferencing service 132 involved in either communication session 212, 224 to generate a modified GSID. As an example, the GSID of the first communication session 212 may be modified to refer to the original GSID of the first communication session 212, the original GSID of the second communication session 224, as well as a reason why the first association has been made. In some embodiments, the reason information may correspond to a description of the communication event that triggered the session monitoring module 124 to invoke the GSID module 128. In some embodiments, the reason information may correspond to a non-technical description of the association between the communication sessions (e.g., "conference event"). It should be appreciated that other reasons may be inserted in the modified GSID. It should also be appreciated that the reason information does not necessarily need to be included in the modified GSID. Rather, the modified GSID may simply include the identification of the GSIDs originally assigned to each communication session (e.g., 0001+0002).

Figure 3:
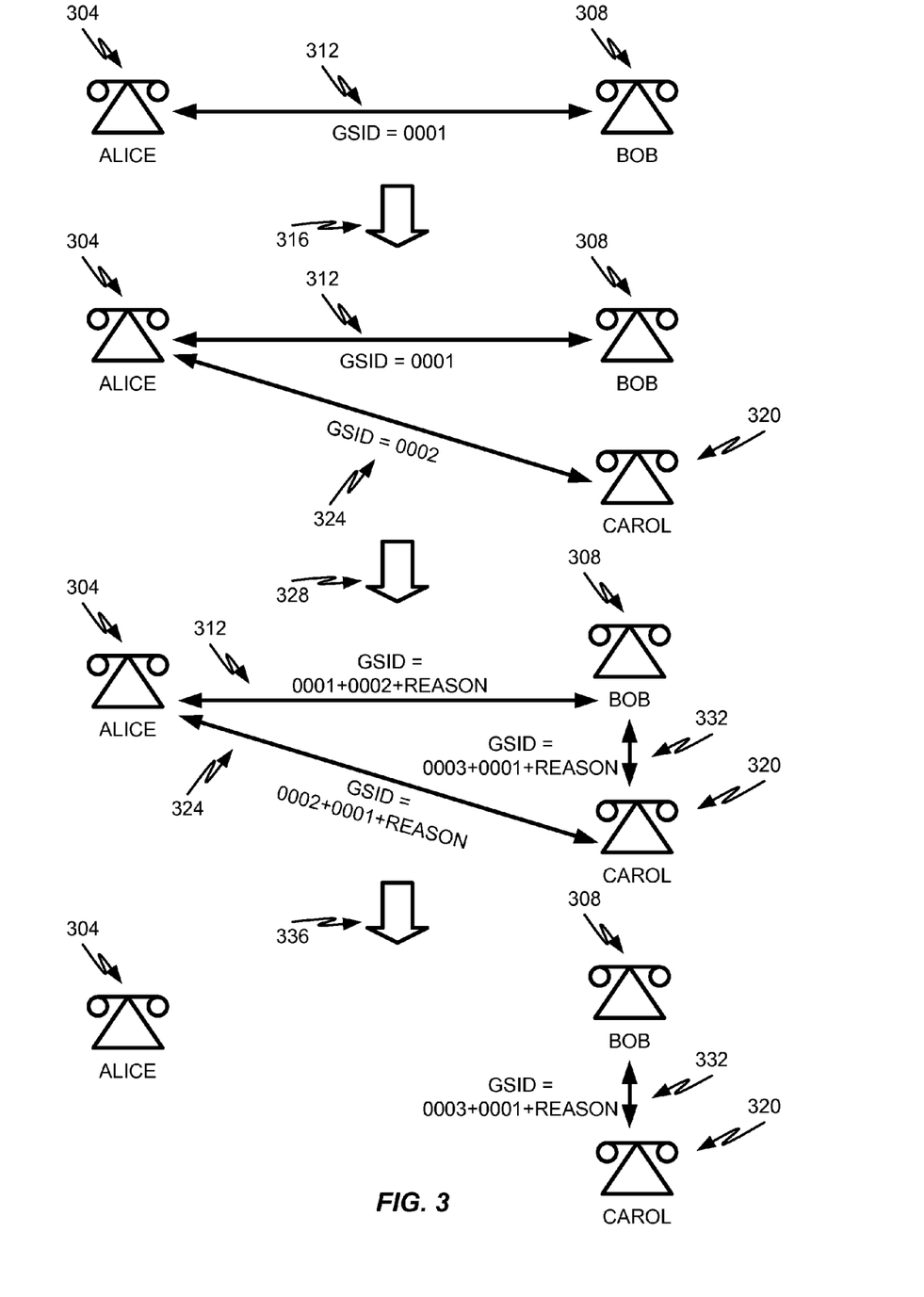
FIG. 3 is a diagram depicting a second communication flow in accordance with embodiments of the present disclosure.

Referring now to FIG. 3, a second communication flow will be described in accordance with embodiments of the present disclosure. The second communication flow begins with a first communication session 312 between a first communication device operated by a first user (e.g., Alice 304) and a second communication device operated by a second user (e.g., Bob 308). The first communication session 312 may have a first GSID (e.g., 0001) assigned thereto by the GSID module 128. The first GSID may be included in one or more message transmitted during the first communication session 312. Specifically, the first GSID may be included in any content-bearing portion or portion(s) of a message such as a header, sub-header, footer, payload, and combinations thereof.

The communication flow continues when a first communication event 316 occurs. The first communication event 316 in this illustrative example includes Alice 304 establishing a connection with a third communication device operated by a third user (e.g., Carol 320). The communication session established between Alice 304 and Carol 320 may be considered a second communication session 324 and may, therefore, have a second GSID (e.g., 0002) assigned thereto. Similar to the first GSID, the second GSID may be carried or represented in one, some or all messages transmitted during the second communication session 324. Furthermore, the second GSID may be assigned by the GSID module 128 of the communication server 120 upon detecting establishment of the second communication session 324.

At this point, Alice 304 may be in a position to transfer Bob 308 to Carol 320 (or vice versa) via a second communication event 328. It should be appreciated that the transfer event may be a single event or multiple events without departing from the scope of the present disclosure. The occurrence of either the first or second communication events 316, 328 may be detected by the session monitoring module 124. The first or second communication event 316, 328 may correspond to any transmission of information that indicates the association of the third communication session 332 with one or both of the first and second communication sessions 312, 324.

The connection between Bob 308 and Carol 320 may be viewed as a third communication session 332 and, therefore, may have a third GSID assigned thereto by the GSID module 128. The third GSID may correspond to a third number that is substantially unique among other communication sessions (e.g., 0003) or the third GSID may be a combination of the first and second GSID (e.g., 0002+0001). Furthermore, the third GSID may comprise reason information that describes the association of the third communication session 332 with one or both of the first and second communication sessions 312, 324.

As can be seen in FIG. 3, the associations between the first communication session 312 and second communication session 324 may also be reflected in the GSIDs of those sessions. These updated GSIDs may be maintained in connection with the first and/or second communication session.

A third communication event or series of events 336 may then occur whereby the sessions between Alice 304 and Bob 308 and Alice 304 and Carol 320 are dropped. At this point, the only communication session remaining is the third communication session 332 between Bob 308 and Carol 320.

Figure 4:
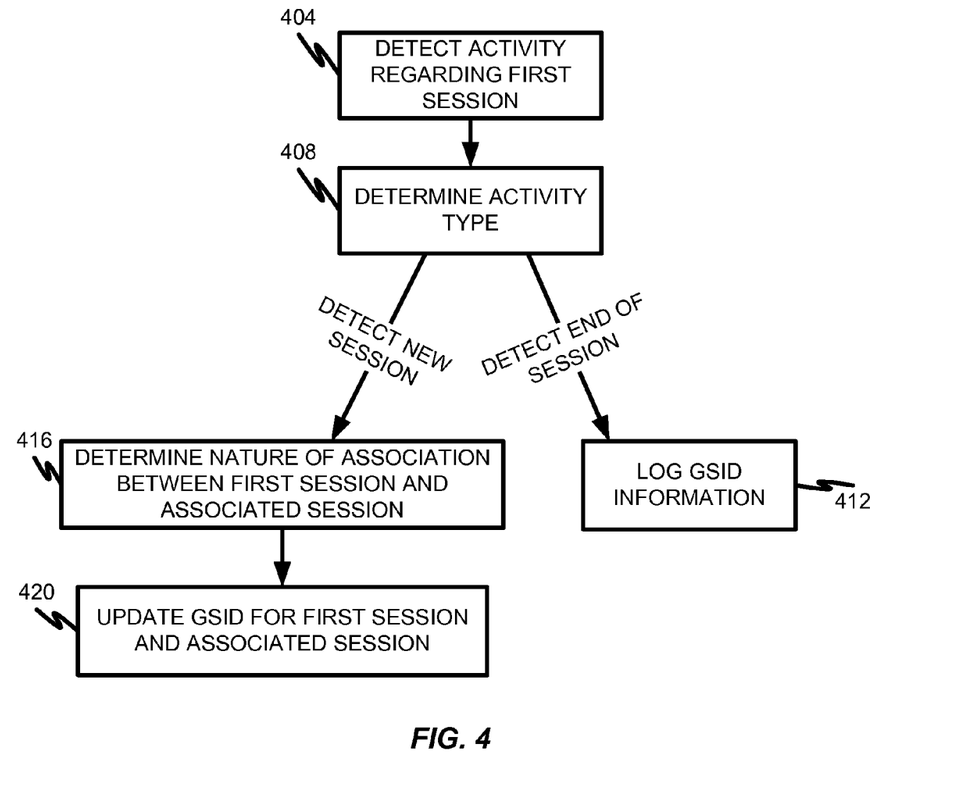
FIG. 4 is a flow diagram depicting a first communication method in accordance with embodiments of the present disclosure.

Referring now to FIG. 4, a first communication method will be described in accordance with embodiments of the present disclosure. The method begins when activity regarding a first session is detected at the communication server 120 (step 404). The communication server 120 may also be configured to determine the type or nature of activity that was detected with respect to the first session (step 408). In particular, the communication server 120 may be configured to determine whether the detected activity corresponds to the detection of a new session (e.g., either the first session is a new session or a new session has been detected in association with the first session) or the detection of a session ending (e.g., either the first session has ended or a session associated with the first session has ended).

If the detected activity corresponds to a session-ending activity, then the GSID information associated with the first communication session (and any other associated session) can be logged or otherwise stored in a communication database so that it is available at a later time if needed (step 412). In some embodiments, the GSID information can be stored in the enterprise database 144 or as call history information for one, some, or all of the participants involved in the first communication session or its associated communication session.

If the detected activity corresponds to a session-beginning activity, then the new communication session (e.g., either the first communication session or an associated communication session) has a GSID assigned thereto.

In some embodiments, the communication server 120 is configured to monitor communications within the communication system 100 and specifically within the enterprise network 104 to determine if the first session is associated with another session by detecting one or more indicators within the first session or within other sessions that refer to the first session to show the first session is associated with the previously-established session. Alternatively, or in addition, the search for associated sessions may occur after the first session is established. Specifically, the session monitoring module 124 may analyze messages exchanged during the first communication session and during subsequent communication sessions to determine if any later-established communication session should be associated with the first communication session. Accordingly, although step 408 depicts the detection of a "new" session, it may be the case that the detected session was already in progress prior to the first communication session, but the association with the first communication session is what makes the associated communication session appear "new" with respect to the first communication session.

If at step 408 the first session is determined to be associated with another communication session, then the method continues with the session monitoring module 124 invoking the GSID module 128 to determine the nature of the association between the first communication session and the associated session (step 416). The GSID module 128 then instructs one or more devices involved in the first session and/or associated session to update their GSID information to reflect the association between the first session and the associated session (step 420). This can be accomplished in a variety of ways and the modification of GSID information can occur at any communication endpoint or intermediate device (e.g., server, switch, router, etc.) involved in the communication sessions. The steps depicted in connection with FIG. 4 may be performed every time any activity regarding a session is detected or it may only be performed when certain predetermined activities are detected.

Figure 5:
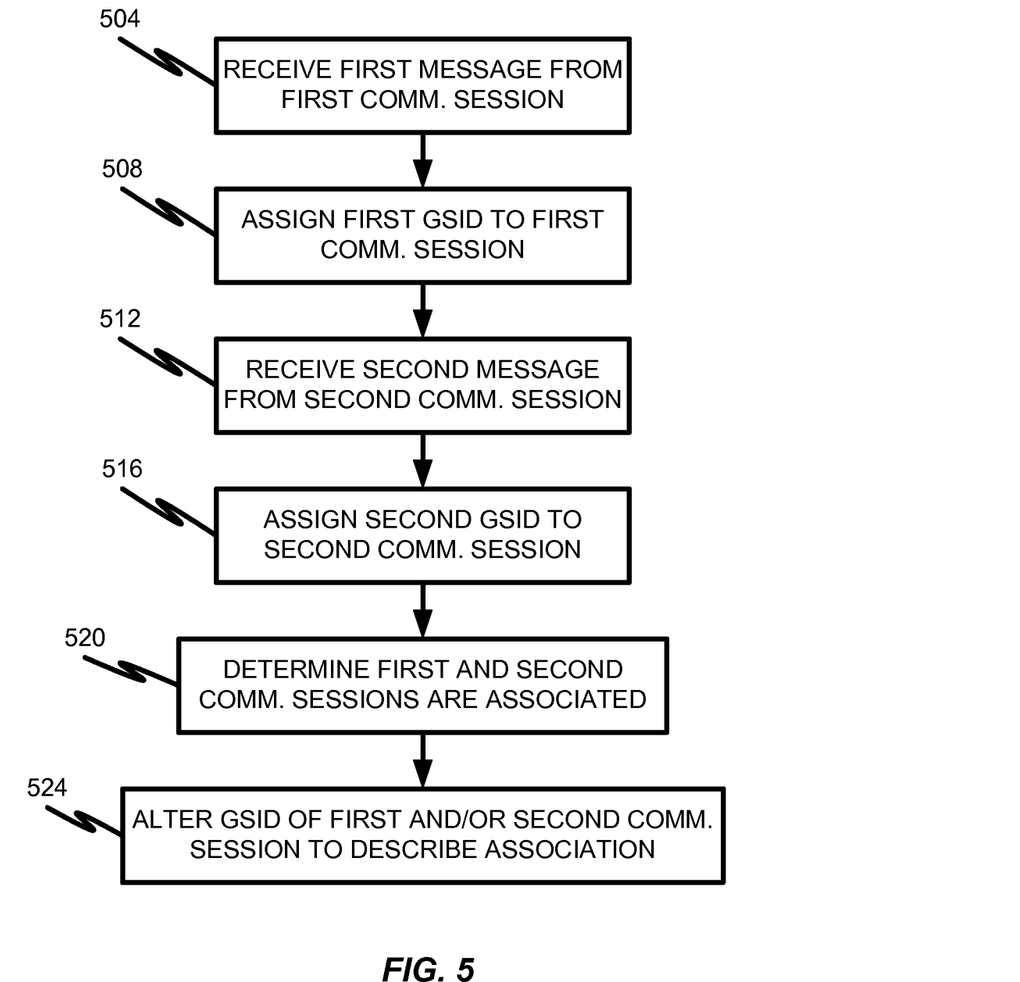
FIG. 5 is a flow diagram depicting a second communication method in accordance with embodiments of the present disclosure.

With reference now to FIG. 5, another communication method will be described in accordance with embodiments of the present disclosure. The method begins when a first message from a first communication session is received (step 504). The first message may be received at the communication server 120, a communication device 112, 136, or any other device in the media or signaling path of the first communication session. Accordingly, the first message may correspond to a message containing media content (e.g., one or more of an RTP packet, http packet, VoIP packet, etc.), a message containing call-control content, or a message used to negotiate and establish the first communication session (e.g., a SIP message, an H.323 message, etc.).

The method continues with the GSID module 128 assigning a first GSID to the first communication session (step 508). Once the first GSID is assigned to the first communication session, each transmission of information during the first communication session may either include or make reference to the first GSID. It is possible, however, to only having selected messages in the first communication session include or make reference to the first GSID.

The first GSID, in some embodiments, is globally unique among GSIDs assigned by the GSID module 128. In some embodiments, every GSID assigned by the GSID module 128 to a communication session is substantially unique. In some embodiments, every GSID assigned by the GSID module 128 at least unique within the universe of GSIDs assigned to communication sessions in the enterprise network 104.

The method continues when a second message from a second communication session is received (step 512). The second message may be received at the communication server 120, a communication device 112, 136, or any other device in the media or signaling path of the second communication session. In some embodiments, the device that receives the second message is the same device that receives the first message. In some embodiments, the device that receives both messages is a communication server. In some embodiments, different communication servers 120 may receive the messages. In some embodiments, the device that receives the second message is not in the media or signaling path of the first communication session. In some embodiments, the device that receives the second message is in at least one of the media and signaling path of the first communication session.

Upon receiving the second message, the GSID module 128 is invoked to assign a second GSID to the second communication session (step 516). Once the second GSID is assigned to the second communication session, each transmission of information during the second communication session may either include or make reference to the second GSID. It is possible, however, to only having selected messages in the second communication session include or make reference to the second GSID.

The method continues when it is determined that the first and second communication sessions are associated with one another (step 520). This determination may be made by the session monitoring module 124 either during the establishment of the second communication session or after the second communication session is already established. Furthermore, this determination may be made by analyzing message transmitted during the first session, messages transmitted during the second session, or a combination of messages transmitted during the first and second sessions. Further still, the first communication session does not necessarily have to use the same media type as the second communication session. For example, one session may be a voice-based session and the other session may be a web-based session.

When the session monitoring module 124 has determined that the first and second sessions are associated, the method continues with the session monitoring module 124 invoking the GSID module 128 to alter the first and/or second GSID to describe the association between the first and second communication sessions (step 524). In some embodiments, the first GSID assigned to the first communication session may be altered to refer to the second GSID. This altered GSID can be referred to as an altered first GSID or a third GSID. In some embodiments, the second GSID assigned to the second communication session may be altered to refer to the first GSID. This altered GSID can be referred to as an altered second GSID, a third GSID (e.g., the same as the altered first GSID), or a fourth GSID. In some embodiments, one or both of the first and second GSID are altered to include reason information that describes why the first communication session was associated with the second communication session.

It should be appreciated that while embodiments of the present disclosure have been described in connection with a particular communication system architecture, embodiments of the present disclosure are not so limited. In particular, those skilled in the communication arts will appreciate that some or all of the concepts described herein may be utilized in any communication system that has the need to identify or troubleshoot communication sessions, especially where the topology of such sessions is likely to be modified.

Furthermore, in the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method, comprising:
receiving, by a communication server, a first message in connection with a first communication session that spans a plurality of Back-to-Back User Agents (B2BUAs);
assigning, by the communication server, a first global session identifier to the first communication session, the first global session identifier corresponding to a token that identifies the first communication session end-to-end even as the first communication session traverses at least one of the plurality of B2BUAs;
receiving, by the communication server, a second message in connection with a second communication session, that also spans the plurality of B2BUAs;
assigning, by the communication server, a second global session identifier to the second communication session, the second global session identifier corresponding to a token that identifies the second communication session end-to-end even as the second communication session traverses at least one of the plurality of B2BUAs;
examining, by the communication server, at least one of a URI, a header, a parameter, or an attachment of the second message for information which indicates the second communication session is logically associated with the first communication session;
determining, by the communication server, at least in response to the examining step, that the first communication session and the second communication session are logically associated with one another; and
in response to determining that the first and second communication sessions are logically associated with one another, configuring, by the communication server, at least one message transmitted during at least one of the first and second communication sessions to indicate the association between the first and second communication sessions, and further configuring the at least one message to incorporate the first and second global session identifiers.

2. The method of claim 1, wherein configuring the at least one message comprises incorporating a third global session identifier in the at least one message.

3. The method of claim 1, wherein configuring the at least one message further comprises providing an indication in the at least one message that provides a reason why the determining step determined the first communication session is logically associated with the second communication session, wherein the indication includes a description of a communication event that triggered the examining step.

4. The method of claim 3, wherein the first and second global session identifiers and the indication describing the reason why the first communication session is logically associated with the second communication session are provided in a header of the at least one message.

5. The method of claim 3, wherein the first and second global session identifiers and the indication describing the reason why the first communication session is logically associated with the second communication session are provided in at least one of a footer, sub-header, and payload of the at least one message.

6. The method of claim 1, wherein the at least one message comprises a SIP message and wherein configuring the at least one message comprises updating parameters of a global session identifier header in the SIP message.

7. The method of claim 1, wherein the first communication session and second communication session are determined to be logically associated with one another by determining that the second message corresponds to an out-of-dialog request not containing a global session identifier.

8. The method of claim 7, wherein the determining step occurs in response to the first communication session changing its topology, wherein the second communication session is the communication session that resulted after the first communication session changed its topology, and wherein the topology change comprises at least one of a change in participants to the first communication session, a change in control exerted by a device over the first communication session, and a transfer of control over the first communication session from a first device to a second device.

9. The method of claim 8, wherein the topology change comprises at least one of a transfer and conference and wherein the out-of-dialog request corresponds to at least one of an out-of-dialog request and response transmitted by a user involved in both the first communication session and the second communication session and wherein the at least one of the out-of-dialog request and response invokes the at least one of the transfer and conference.

10. The method of claim 1, further comprising:
analyzing mid-dialog requests and responses transmitted in connection with the second communication session;
based on an analysis of the mid-dialog requests and responses, determining, during at least one of a call and feature phase, that the second communication session is logically associated with the first communication session.

11. A non-transitory computer-readable medium comprising processor-executable instructions that, when executed by a processor, perform the method of claim 1.

12. A method, comprising:
assigning, by a communication server, a first communication session a first global session identifier, wherein the first communication session spans a plurality of Back-to-Back User Agents (B2BUAs);
detecting, by the communication server, a topology change in the first communication session, the topology change in the first communication session resulting in a modified communication session; and
in response to detecting the topology change in the first communication session, assigning the modified communication session a second global session identifier, the second global session identifier providing an indication of the detected topology change and associating the modified communication session with the first communication session, wherein the indication in at least one message describes a reason why the first communication session is logically associated with a second communication session includes a description of the topology change and further configuring the at least one message to incorporate the first and second global session identifiers.

13. The method of claim 12, wherein the topology change comprises at least one of a change in participants to the first communication session, a change in devices to the first communication session, a change in control exerted by a device over the first communication session, and a transfer of control over the first communication session from a first device to a second device.

14. The method of claim 12, wherein the topology change comprises at least one of a conference and transfer.

15. The method of claim 12, wherein the second global session identifier is included in a header value as a parameter of a message header transmitted during the modified communication session.

16. The method of claim 12, wherein the second global session identifier includes the first global session identifier as well as information describing a way in which the topology change was detected.

17. A communication system, comprising:
a communication server configured to receive a first message in connection with a first communication session that spans a plurality of Back-to-Back User Agents (B2BUAs), assign a first global session identifier to the first communication session, the first global session identifier corresponding to a token that identifies the first communication session end-to-end even as the first communication session traverses at least one of the plurality of B2BUAs, receive a second message in connection with a second communication session that also spans the plurality of B2BUAs, assign a second global session identifier with the second communication session, the second global session identifier corresponding to a token that identifies the second communication session end-to-end even as the second communication session traverses one or more B2BUAs, determine that the first communication session and the second communication session are logically associated with one another, and, in response to determining that the first and second communication sessions are logically associated with one another based on an examination of at least one of a URI, a header, a parameter, or an attachment of the second message, configure at least one message transmitted during at least one of the first and second communication sessions to indicate the association between the first and second communication sessions, and further configuring the at least one message to incorporate the first and second global session identifiers.

18. The system of claim 17, further comprising at least one of a database, signaling trace, error log, and call record that contains information related to the first and second global session identifiers.

19. The system of claim 17, wherein the at least one message comprises both the first and second global session identifiers as well as an indication providing a reason why the first communication session is logically associated with the second communication session, wherein the indication includes a description of a communication event that triggered the examining step.

20. The system of claim 19, wherein the indication providing the reason why the first communication session is logically associated with the second communication session includes an identifier of an out-of-dialog request that was detected by the communication server to determine that the first communication session is associated with the second communication session.

* * * * *